United States Patent
Stuntebeck et al.

(10) Patent No.: US 9,712,477 B2
(45) Date of Patent: Jul. 18, 2017

(54) EMAIL NOTIFICATIONS

(71) Applicant: AirWatch LLC, Atlanta, GA (US)

(72) Inventors: Erich Stuntebeck, Marietta, GA (US); Sridhara Babu Kommireddy, Alpharetta, GA (US); Evan Hurst, Atlanta, GA (US)

(73) Assignee: AirWatch LLC, Atlanta, GA (US)

( * ) Notice: Subject to any disclaimer, the term of this patent is extended or adjusted under 35 U.S.C. 154(b) by 154 days.

(21) Appl. No.: 14/701,891

(22) Filed: May 1, 2015

(65) Prior Publication Data
US 2016/0323226 A1    Nov. 3, 2016

(51) Int. Cl.
*G06F 15/16*    (2006.01)
*H04L 12/58*    (2006.01)

(52) U.S. Cl.
CPC ..................... *H04L 51/24* (2013.01)

(58) Field of Classification Search
CPC .............................. H04L 51/24; H04L 43/10
See application file for complete search history.

(56) References Cited

U.S. PATENT DOCUMENTS

| | | | |
|---|---|---|---|
| 2009/0222527 A1* | 9/2009 | Arconati | G06F 21/31 709/206 |
| 2010/0088387 A1* | 4/2010 | Calamera | H04L 12/587 709/207 |
| 2011/0004549 A1* | 1/2011 | Gray | G06Q 20/102 705/40 |
| 2011/0173454 A1* | 7/2011 | Paley | H04L 63/10 713/189 |
| 2012/0240054 A1* | 9/2012 | Webber | G06Q 10/107 715/752 |

* cited by examiner

*Primary Examiner* — John B Walsh

(57) ABSTRACT

Disclosed are various examples for communicating notifications for received email messages. A monitoring service monitors inboxes to which clients are subscribed. When a message arrives in a subscribed inbox, the monitoring service sends a notification to a notification brokering service. The notification brokering service then forwards the notification to the appropriate notification service for communication to a subscribed client.

20 Claims, 4 Drawing Sheets

EMAIL NOTIFICATIONS

BACKGROUND

Devices can access email inboxes to retrieve delivered messages. A user of these devices can wish to be notified when a new message is delivered to an inbox the device is accessing. The device can require near real-time feedback as to whether a message has been delivered to the inbox.

The device can execute an application that continually monitors the email inbox to determine when a message is delivered. However, this requires the device to run the application as an active or background process. Some device operating systems can restrict or control when an application is executed as an active or background process in order to optimize battery consumption or to otherwise enhance device performance. In these instances, if the device is not actively running the application, the application will not monitor the inbox accessed by the device. This prevents the device from presenting notifications to a user of the device that an inbox has received a new message.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

A client application on a mobile device can access one or more email inboxes to allow a user of a device to send and receive email messages. A user of the client application can require near real-time notifications of when a message is delivered to an inbox accessed by the mobile device. If the client application is executed as an active or background process, the application can periodically query an email service to determine if the inbox received a message. However, some devices or operating systems can restrict or otherwise control when an application is allowed to run as a background process. For example, an operating system can periodically redesignate which background processes are executed, leaving some background processes temporarily suspended. If a background process for querying the email service is suspended, the device can be unable to determine if a new message was delivered to the inbox. Although a client application can be unable to execute as a background process to actively query the email service, the client application can be able to receive notifications such as push notifications from a notification service corresponding to the device.

A monitoring service can maintain subscription information for client devices indicating from which inboxes a client device can access. The monitoring service can then access the email service to determine if a new message has been delivered to the inboxes to which the client devices are subscribed. When the monitoring service determines that a new message has been delivered to an inbox, the monitoring service can then select device access tokens for the client devices that can access the inbox to which the new message was delivered. The monitoring service can send the device access tokens and a notification to a notification brokering service.

After receiving the device access tokens and the notification, the notification brokering service can determine to which notification services the notification and a respective device access token should be sent. The notification brokering service can then send the notification and the device access tokens to the respective notification services, which can communicate the notification to corresponding client devices using the device access tokens.

Figure 1:
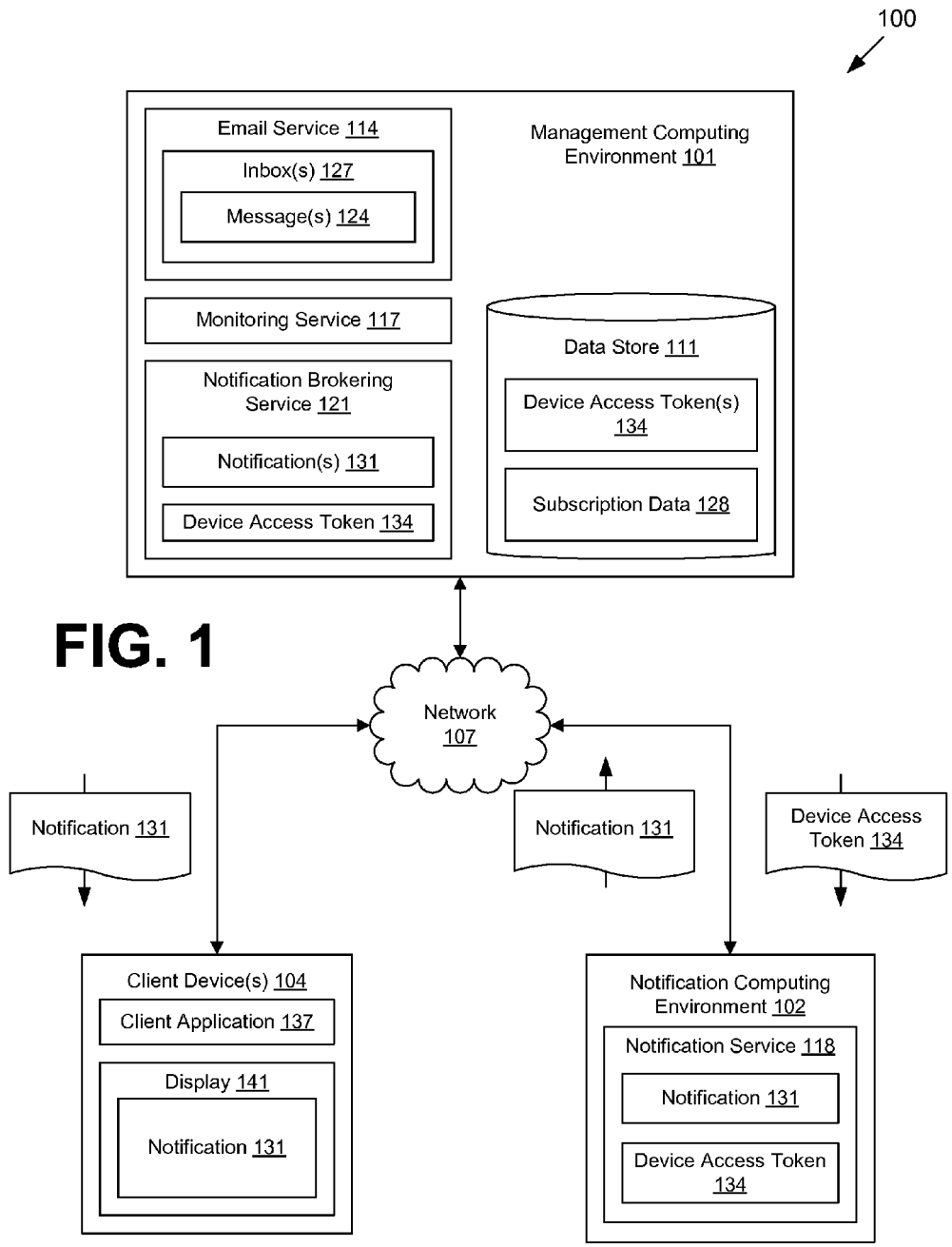
FIG. 1 is a drawing of a networked environment according to various examples.

With reference to FIG. 1, shown is a networked environment 100 according to various examples. The networked environment 100 includes a management computing environment 101, a notification computing environment 102, and client devices 104, which are in data communication with each other via a network 107. The network 107 includes, for example, the Internet, intranets, extranets, wide area networks (WANs), local area networks (LANs), wired networks, wireless networks, other suitable networks, or any combination of two or more such networks. For example, such networks can include satellite networks, cable networks, Ethernet networks, and other types of networks.

The management computing environment 101 and notification computing environment 102 can respectively include, for example, a server computer or any other system providing computing capability. Alternatively, the management computing environment 101 or notification computing environment 102 can employ a plurality of computing devices that can be arranged, for example, in one or more server banks, computer banks or other arrangements. These computing devices can be located in a single installation or can be distributed among many different geographical locations. For example, the management computing environment 101 or notification computing environment 102 can include a plurality of computing devices that together can include a hosted computing resource, a grid computing resource and/or any other distributed computing arrangement. In some cases, the management computing environment 101 or notification computing environment 102 can correspond to an elastic computing resource where the allotted capacity of processing, network, storage, or other computing-related resources can vary over time. The management computing environment 101 or notification computing environment 102 can also include or be operated as one or more virtualized computer instances. Generally, the management computing environment 101 or notification computing environment 102 is operated in accordance with particular security protocols such that it is considered a trusted computing environment. The data stored in the data store 111 is associated with the operation of the various components described below.

Various applications or other functionality can be executed in the management computing environment 101 and notification computing environment 102 according to various examples. The data store 111 can be representative of a plurality of data stores 111. The data stored in the data store 111, for example, is associated with the operation of the various applications and/or functional entities described below.

The components executed on the management computing environment 101, for example, can include an email service 114, a monitoring service 117, and a notification brokering service 121. The components executed on the notification computing environment 102, for example, can include a notification service 118, and other applications, services, processes, systems, engines, or functionality not discussed in detail herein. The email service 114 can facilitate the storage, communication, and receipt of email messages 124. To this end, the email service 114 can include an email server or similar application. The email service 114 can maintain various inboxes 127 as destinations for communicated messages 124. For example, inboxes 127 can correspond to one or more email addresses or other identifiers to which messages 124 are directed. Inboxes 127 can also include folders or groupings of messages 124, allowing the email service 114 to classify received messages 124. The email service 114 can classify messages into respective inboxes 127 by applying business logic rules, a machine learning approach, or another approach.

The monitoring service 117 can monitor inboxes 127 of the email service 114 to determine if a message 124 has been delivered to an inbox 127. For example, the monitoring service 117 can query the email service 114 to determine if a message 124 has been delivered to an inbox 127 since the last query. To this end, the monitoring service 117 can access or maintain subscription data 128 indicating which client devices 104 have permission to or are configured to access a respective inbox 127. These client devices 104 are hereinafter described as being subscribed to a respective inbox 127. If a new message 124 arrives at an inbox 127, the monitoring service 117 can forward a notification 131 and device access tokens 134 for the client devices 104 subscribed to the inbox 127 to the notification brokering service 121.

The notification brokering service 121 can receive notifications 131 and device access tokens 134 from the monitoring service 117, and can forward the notifications 131 and device access tokens 134 to the notification service 118. To this end, the notification brokering service 121 can maintain a queue or other data structure for notifications and device access tokens 134. In examples in which notifications 131 and device access tokens 134 can be communicated to one of many notification services 118, the notification brokering service 121 can determine to which notification service 118 the notifications 131 and device access tokens 134 should be sent based upon a device type, a device operating system, or based on other criteria.

The notification service 118 can communicate notifications 131 to client devices 104 using device access tokens 134 granting permissions to access the corresponding client devices 104. For example, the notification service 118 can include a push notification service, or another service as can be appreciated. In some examples, multiple notification services 118 can be implemented. These notification services 118 can be implemented for communicating notifications 131 to different client device 104 device types, client devices 104 conforming or implementing different notification 131 standards or protocols, client devices 104 implementing different operating systems or applications, or client devices 104 otherwise distinguished with respect to each other. The notification service 118 can be operated by a third party and accessed by the management computing environment 101 using an exposed Application Program Interface or through other functionality.

The data stored in the data store 111 can include, for example, device access tokens 134, subscription data 128, and potentially other data. Device access tokens 134 can include an identifier, key, or other value that grants permission to perform operations on a corresponding client device 104. For example, device access tokens 134 can grant permissions to push a notification 131 to a client device 104. Device access tokens 134 can also grant permissions to push applications, updates, or other content for installation or execution on a client device 104. Device access tokens 134 can be unique with respect to a client device 104, or unique with respect to an instance of a client application 137 executed on the client device 104.

Subscription data 128 can encode a relationship between a client device 104 and an inbox 127, indicating that the client device 104 should be notified when a message 124 arrives at a particular inbox 127. These client devices 104 are considered to be subscribed to the particular inbox 127. Subscription data 128 can also indicate other data associated with a client device 104, such as a corresponding notification service 118, permission or security settings, and potentially other data.

The client device 104 is representative of a plurality of client devices that can be coupled to the network 107. The client device 104 can include, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 104 can include a display 141. The display 141 can include, for example, one or more devices such as liquid crystal display (LCD) displays, gas plasma-based flat panel displays, organic light emitting diode (OLED) displays, electrophoretic ink (E ink) displays, LCD projectors, or other types of display devices.

The client device 104 can be configured to execute various applications such as a client application 137 and/or other applications. The client application 137 can be executed in a client device 104, for example, to access network content served up by the management computing environment 101, notification computing environment 102, and/or other servers, thereby rendering a user interface on the display 141. To this end, the client application 137 can include, for example, a mail client. The client device 104 can be configured to execute applications beyond the client application 137 such as, for example, a browser, dedicated applications, social networking applications, word processors, spreadsheets, or other applications.

Next, a general description of the operation of the various components of the networked environment 100 is provided. To begin, a client device 104 can subscribe to an inbox 127 of the email service 114. In an example, the client device 104 can communicate an indication to the management computing environment 101 to subscribe to an inbox 127. In another example, an administrator or other user can designate a client device 104 as being subscribed to an inbox 127. When a client device 104 is subscribed to an inbox 127, the monitoring service 117 updates subscription data 128 indicating that the client device 104 is associated with the subscribed inbox 12, and should receive notifications 131 upon delivery of a message 124 to the inbox 127. The monitoring service 117 can also receive and store a device access token 134 from a client device 104, from a notification service 118 corresponding to the client device 104, or from another source. If the inbox 127 subscribed to by the newly subscribing client device 104 is not currently monitored by the monitoring service 117, the monitoring service 117 adds the respective inbox 127 to a collection of monitored inboxes 127. For example, the monitoring service 117 can periodically access a predefined list or collection of inboxes 127 to determine if a message 124 has been delivered to a respective inbox 127. In such an example, the currently unmonitored inbox 127 for the newly added client device 104 can be added to the predefined list or collection of inboxes 127 such that it is monitored by subsequent queries of the monitoring service 117.

Next, the monitoring service 117 can monitor inboxes 127 of the email service 114. The monitoring service 117 can monitor inboxes 127 by querying the email service 114 at a predefined interval or according to other criteria to determine if an inbox 127 received a message 124 since the last query. The monitoring service 117 can also monitor inboxes 127 by listening for notifications 131 or other communications from the email service 114 indicating the delivery of a message 124.

When an inbox 127 monitored by the monitoring service 117 receives a message 124, the monitoring service 117 can access subscription data 128 to determine which client devices 104 should be notified of the receipt of the message 124. This can include executing an Application Program Interface (API) call to one or more services or applying a query to the data store 111 to obtain a response indicating a selection of client devices 104. In this example, the response can also include device access tokens 134 for the indicated client devices 104. The response can also include security settings or other permissions associated with the indicated client devices 104, as will be discussed in further detail below.

Next, the monitoring service 117 can generate one or more notifications 131 for communication to the client devices 104 subscribed to the inbox 127 that received the message 124. The notifications 131 can be generated according to security settings or permissions for the subscribed client devices 104. For example, a notification 131 can include a string or other data to be rendered on a display 141 of a client device 104 upon receipt of the notification 131. In a high security setting, or if a client device 104 has a lower permission level, the string can include a default message indicating the delivery of a message 124 to the subscribed inbox 127. In a lower security setting, or if the client device 104 has a higher permission level, the notification 131 can include portions of the message 124, metadata of the message 124, or other information. For example, the notification 131 can indicate a subject of the message 124, a sender of the message 124, portions of the message 124 body, or other information.

The monitoring service 117 can then forward the notifications 131 and device access tokens 134 for the subscribed client devices 104 to a notification brokering service 121. The notification brokering service 121 then forwards the notifications 131 and device access tokens 134 to notification services 118 corresponding to the subscribed client devices 104. In an example, the notification brokering service 121 can determine to which of many notification services 118 a notification 131 should be sent. This can include accessing metadata, subscription data 128, or other data indicating a notification service 118 as corresponding to a client device 104. For example, the notification brokering service 121 can access original equipment manufacturer (OEM) data for the client device 104 to be notified. The notification brokering service 121 can then send the notification 131 to the notification service 118 corresponding to the OEM. This can also include accessing data encoded in a device access token 134 to determine a corresponding notification service 118.

The notification services 118 can then communicate the notifications 131 to the client devices 104 with the respective device access tokens 134. In some examples, this can include communicating a Universal Datagram Protocol (UDP) message, push notification 131, streaming notification 131, or other notification 131 format to a client device 104. The client application 137 then renders the notification 131 on the display 141 of the client device 104.

In addition to the operations described above, the monitoring service 117 can update device access tokens 134 for subscribed client devices 104. For example, a notification service 118 or client device 104 can change or redefine a device access token 134. The client application 237 or notification service 118 can communicate the updated device access token 134 to the monitoring service 117. The monitoring service 117 can then update the expired device access token 134 with the new device access token 134.

The monitoring service 117 can also update subscription data 128 or modify monitoring operations when a client device 104 is no longer subscribed to an inbox 127. This can include, for example, modifying or updating subscription data 128. If the unsubscribing or removed client device 104 was the only client device 104 subscribed to an inbox 127, this would result in the inbox 127 no longer having a subscribed client device 104. In such an example, the monitoring service 117 can no longer monitor the respective inbox 127.

Although the monitoring service 117 and notification brokering service 121 are shown as separate services, it is understood that the functionality described above for the monitoring service 117 and notification brokering service 121 can be performed by the same service, or further delegated to other services. Additionally, although the email service 114 is shown as executed in the management computing environment 101, it is understood that the email service 114 can be executed in a computing environment distinct from the management computing environment 101.

Figure 2:
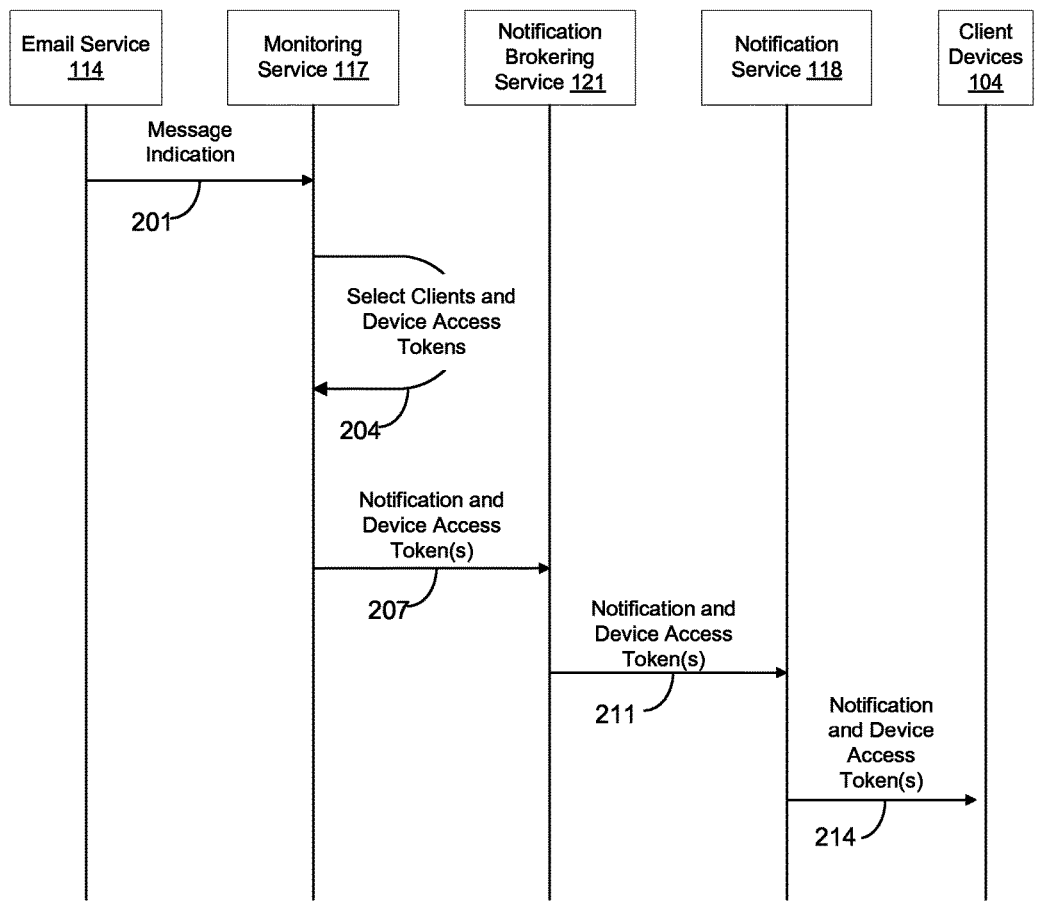
FIG. 2 is sequence diagram for the components depicted in the networked environment of FIG. 1 according to various examples.

Turning now to FIG. 2, shown is a sequence diagram for the email service 114, monitoring service 117, notification brokering service 121, notification service 118, and client device 104 according to various examples of the present disclosure. As shown in step 201, the monitoring service 117 can receive an indication from the email service 114 that an inbox 127 received a message 124. The indication can be communicated between the email service 114 and the monitoring service 117 in response to a query or request from the monitoring service 117. The indication can also be pushed by the email service 114 to the monitoring service 117, or otherwise communicated. At step 204, the monitoring service 117 can select client devices 104 subscribed to the inbox 127 receiving the message 124 and their corresponding device access tokens 134.

Next, in step 207, the monitoring service 117 can communicate a notification 131 indicating the arrival of the message 124 in the inbox 127 and the selected device access tokens 134 to the notification brokering service 121. The notification brokering service 121 can then forward the notification 131 and the respective device access token 134 to the appropriate notification service 118 for the client devices 104 in step 211. In step 214, the notification services 118 can communicate the notification 131 to client devices 104 with the corresponding device access token 134.

Figure 3:
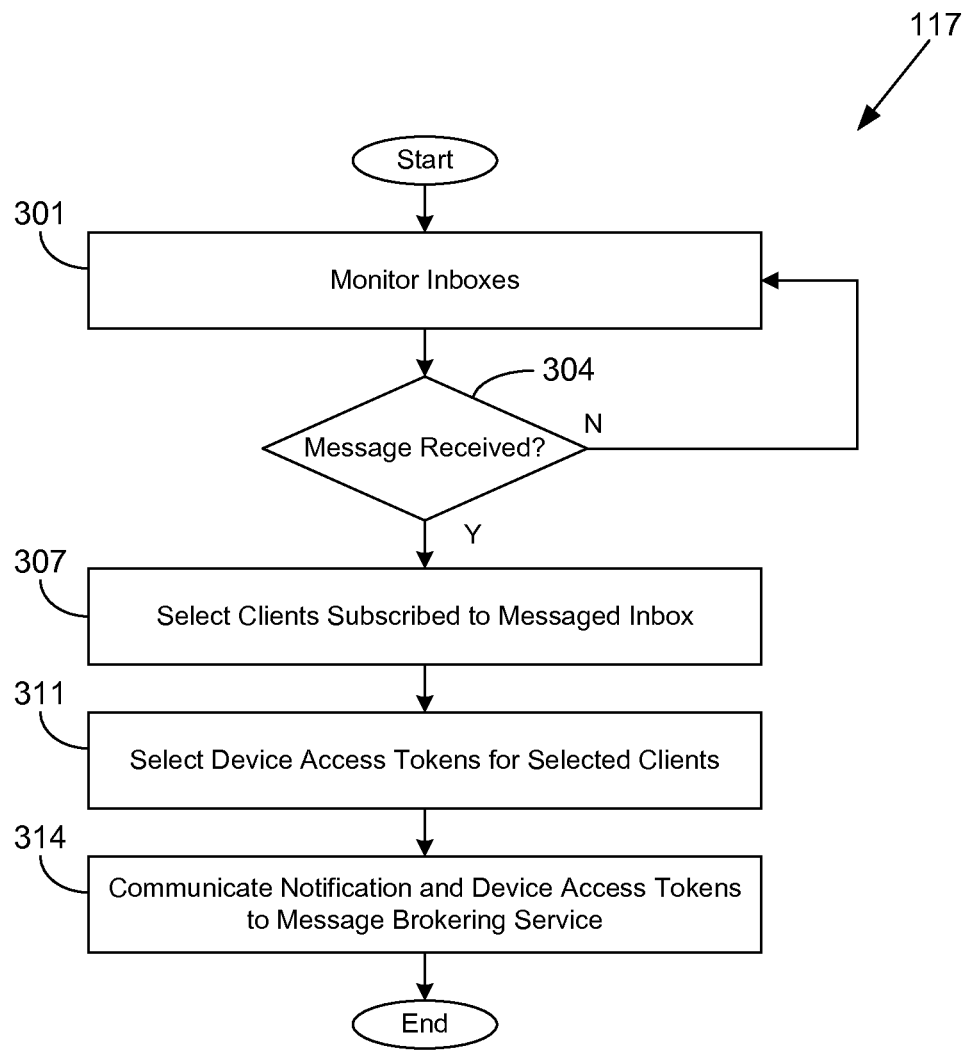
FIG. 3 is a flowchart illustrating one example of functionality implemented as portions of a monitoring service executed in a computing environment in the networked environment of FIG. 1 according to various examples.

Moving on to FIG. 3, shown is a flowchart that provides one example of the operation of a portion of the monitoring service 117. As an alternative, the flowchart of FIG. 3 can be viewed as depicting an example of elements of a method implemented in the management computing environment 101 according to one or more examples.

Beginning with step 301, the monitoring service 117 can monitor inboxes 127 of an email service 114 to determine if an inbox 127 has received a new message 124. The monitoring service 117 can monitor inboxes 127 according to subscription data 128. For example, the monitoring service 117 can access subscription data 128 to determine to which inboxes 127 client devices 104 are subscribed. The monitoring service 117 can then monitor the subscribed inboxes 127.

The monitoring service 117 can monitor inboxes 127 by querying the email service 114 to determine if a monitored inbox 127 received a message 124 since a previous query. This can also include the monitoring service 117 listening for a notification 131 from the email service 114 indicating the arrival of a message 124.

In step 304, if a monitored inbox 127 has not received a message 124, the process returns to step 301, where the monitoring service 117 can continue to monitor the inboxes 127. If a monitored inbox 127 has received a message 124, the process advances to step 307 where the monitoring service 117 can select client devices 104 subscribed to the inbox 127 to which the message 124 was delivered. This can include executing an API call to one or more services to receive a selection of client devices 104. This can also include querying a data store 111 storing subscription data 128. The subscription data 128 can encode subscription relationships between client devices 104 and inboxes 127.

Next, in step 311, the monitoring service 117 can select device access tokens 134 for the selected client devices 104. This can include executing an API call to one or more services to receive the device access tokens 134. This can also include querying a data store 111 for the device access tokens 134. After selecting client devices 104 and device access tokens 134, in step 314, the monitoring service 117 can communicate a notification 131 indicating the received message 124 and the selected device access tokens 134 to a notification brokering service 121. As an example, the notification 131 can include portions of the message 124 or metadata of the message 124. This can include a portion of a message 124 body, an indication of a sender, a subject of the message 124, time stamp information, or other information. The notification 131 can also include a default string or text to be rendered by a client device 104 that indicates the arrival of the message 124. This can prevent a notification 131 from visibly rendering potentially confidential or secure information when a client device 104 renders the notification 131. After communicating the notification 131 and device access tokens 134 to the notification brokering service 121, the process ends.

Figure 4:
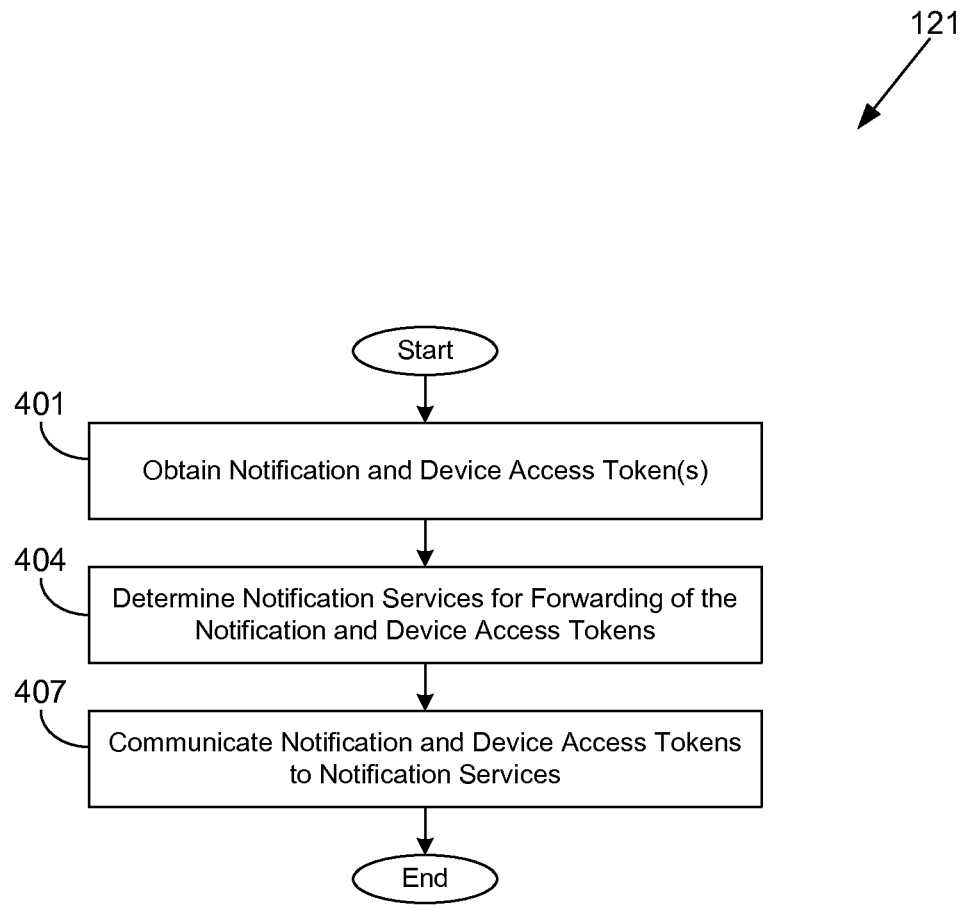
FIG. 4 is a flowchart illustrating one example of functionality implemented as portions of a notification brokering service executed in a computing environment in the networked environment of FIG. 1 according to various examples.

Moving on to FIG. 4, shown is a flowchart that provides one example of the operation of a portion of the notification brokering service 121. As an alternative, the flowchart of FIG. 4 can be viewed as depicting an example of elements of a method implemented in the management computing environment 101.

Beginning with step 401, the notification brokering service 121 can obtain a notification 131 and device access tokens 134 from the monitoring service 117. The notification brokering service 121 can store the received notification 131 and device access tokens 134 in a queue, or otherwise maintain the notification 131 and device access tokens 134. Next, in step 404, the notification brokering service 121 can determine to which notification services 118 the notification 131 should be sent. As one example, the notification brokering service 121 can access metadata or other data obtained from the monitoring service 117 identifying the notification services 118. As another example, the notification brokering service 121 can identify a notification service 118 from identifiers or encodings of the device access tokens 134.

Next, in step 407, the notification brokering service 121 can communicate the notification 131 and the respective device access tokens 134 to the corresponding notification services 118. This allows the notification service 118 to send the notification 131 to the subscribed client device 104 using the corresponding device access token 134. The notification brokering service 121 can communicate notifications 131 according to a queue or other data structure. The notification brokering service 121 can also communicate notifications 131 according to a priority, tag, or other metadata associated with the notifications 131 indicating that certain notifications 131 should be preferentially communicated before others.

The flowcharts of FIGS. 3-4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, troubleshooting aid, or other purposes. It is understood that all such variations are within the scope of the present disclosure.

The management computing environment 101, the notification computing environment 102, the client device 104, or other components described herein can each include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the email service 114, monitoring service 117, notification brokering service 121, notification service 118, or other components can be stored in one or more storage devices and be executable by one or more processors. Also, a data store, such as the data store 111, can be stored in the one or more storage devices.

The email service 114, monitoring service 117, notification brokering service 121, notification service 118, or other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include, for example, one or more microprocessors, discrete logic circuits having logic gates for implementing various logic functions upon an application of one or more data signals, application specific integrated circuits (ASICs) having appropriate logic gates, and programmable logic devices (e.g., field-programmable gate array (FPGAs) and complex programmable logic devices (CPLDs)).

Also, one or more or more of the components described herein that include software or program instructions can be embodied in any non-transitory computer-readable medium for use by or in connection with an instruction execution system such as, for example, a processor in a computer system or other system. The computer-readable medium can contain, store, or maintain the software or program instructions for use by or in connection with the instruction execution system.

A computer-readable medium can include a physical media, such as, magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executable in at least one computing device, the program, when executed by the at least one computing device, being configured to cause the at least one computing device to at least:
   monitor at least one inbox associated with an email service, the at least one inbox being associated with at least one client device;
   determine whether a security preference specifies that a notification should include a default string indicating arrival of a new email message or at least a portion of the new email message;
   generate the notification indicating a delivery of a new email message to the at least one inbox, the notification comprising the default string or the at least a portion of the new email message based upon the security preference; and
   communicate the notification to a push notification service corresponding to the at least one client device.

2. The non-transitory computer-readable medium of claim 1 wherein the program is further configured to cause the at least one computing device to:
   select at least one device token corresponding to the at least one client device; and
   communicate the at least one device token with the notification to the push notification service.

3. The non-transitory computer-readable medium of claim 1, wherein the program is further configured to cause the at least one computing device to identify the push notification service from a plurality of push notification services based at least in part on an original equipment manufacturer (OEM) of the at least one client device.

4. The non-transitory computer-readable medium of claim 1, wherein the notification includes the at least a portion of the new email message when the security preference permits the at least a portion of the new email message to be included in the notification.

5. The non-transitory computer-readable medium of claim 1, wherein the program is further configured to:
   determine whether the at least one client device is associated with another inbox excluded from at least one inbox being monitored; and
   add, in response to the other inbox being excluded from the at least one inbox being monitored, the other inbox to the at least one inbox being monitored.

6. The non-transitory computer-readable medium of claim 1, wherein the program is further configured to:
   determine whether the at least one inbox is associated with the at least one client device; and
   ceasing to monitor the at least one inbox in response to the at least one inbox not being associated with the at least one client device.

7. The non-transitory computer-readable medium of claim 1, wherein the notification includes the default string when the security preference fails to permit the at least a portion of the new email message to be included in the notification.

8. A system, comprising:
   a processor and instructions in memory that, when executed by the processor, cause the processor to at least:
      monitor at least one inbox associated with an email service, the at least one inbox being associated with at least one client device;
      select at least one device token corresponding to the at least one client device;
      determine whether a notification indicating delivery of a new email message should include a default string indicating arrival of the new email message or at least a portion of the new email message according to a security preference;
      generate the notification indicating delivery of the new email message; and
      communicate, to at least one push notification service, the notification and the at least one device token corresponding to the at least one client device.

9. The system of claim 8, wherein the instructions further cause the processor to at least identify the at least one push notification service from a plurality of push notification services based at least in part on an original equipment manufacturer (OEM) of the at least one client device.

10. The system of claim 8, wherein the notification includes the default string, the default string hiding the at least a portion of the new email message in response to the new email message containing confidential information.

11. The system of claim 8, wherein the notification includes the at least a portion of the new email when the security preference permits the at least a portion of the new email message to be included in the notification.

12. The system of claim 8, wherein the instructions further cause the processor to at least:
generate the notification to include the default string responsive to the security preference indicating a greater security level; and
generate the notification to include the at least a portion of the new email message responsive to the security preference indicating a lower security level.

13. The system of claim 8, wherein the instructions further cause the processor to at least:
determine whether the at least one client device is associated with another inbox excluded from at least one inbox being monitored; and
add, in response to the other inbox being excluded from the at least one inbox being monitored, the other inbox to the at least one inbox being monitored.

14. The system of claim 8, wherein the instructions further cause the processor to at least:
determine whether the at least one inbox is associated with the at least one client device; and
ceasing to monitor the at least one inbox in response to the at least one inbox not being associated with the at least one client device.

15. A method, comprising:
monitoring at least one inbox associated with an email service, the at least one inbox being associated with at least one client device;
selecting at least one device token corresponding to the at least one client device;
determining whether a notification indicating delivery of a new email message should include a default string indicating arrival of the new email message or at least a portion of the new email message according to a security preference;
generating the notification indicating a delivery of the new email message; and
communicating, to at least one push notification service, the notification and the at least one device token.

16. The method of claim 15, further comprising identifying the push notification service from a plurality of push notification services based at least in part on an original equipment manufacturer (OEM) of the at least one client device.

17. The method of claim 15, wherein the default string hides the at least a portion of the new email message.

18. The method of claim 17, further including the at least a portion of the new email message in the notification in response to the security preference permitting the at least a portion of the new email message in the notification.

19. The method of claim 15, further comprising:
determining whether the at least one client device is associated with another inbox excluded from at least one inbox being monitored; and
adding, in response to the other inbox being excluded from the at least one inbox being monitored, the other inbox to the at least one inbox being monitored.

20. The method of claim 15, wherein notification includes at least one of a push notification, a User Datagram Protocol (UDP) message, or a streaming notification.

* * * * *